United States Patent
Pandit et al.

(10) Patent No.: US 11,867,280 B2
(45) Date of Patent: Jan. 9, 2024

(54) SYSTEMS AND METHODS FOR CONTROLLING AXLE OIL TEMPERATURE

(71) Applicant: DEERE & COMPANY, Moline, IL (US)

(72) Inventors: Mahesh G Pandit, Osmanabad (IN); Bhushan A. Dandage, Pune (IN)

(73) Assignee: Deere & Company, Moline, IL (US)

( * ) Notice: Subject to any disclaimer, the term of this patent is extended or adjusted under 35 U.S.C. 154(b) by 312 days.

(21) Appl. No.: 17/248,668

(22) Filed: Feb. 2, 2021

(65) Prior Publication Data

US 2022/0243801 A1 Aug. 4, 2022

(51) Int. Cl.
*F16H 57/04* (2010.01)
*F16H 59/72* (2006.01)

(52) U.S. Cl.
CPC ......... *F16H 57/0413* (2013.01); *F16H 59/72* (2013.01)

(58) Field of Classification Search
CPC ............. F16H 57/0413; F16H 57/0416; F16H 57/0435; F16H 59/72
See application file for complete search history.

(56) References Cited

U.S. PATENT DOCUMENTS

| | | | |
|---|---|---|---|
| 6,360,840 B1 | 3/2002 | Bell et al. | |
| 6,401,870 B2 | 6/2002 | Roy et al. | |
| 7,845,471 B2 | 12/2010 | Bares et al. | |
| 9,897,253 B2 | 2/2018 | Delp et al. | |
| 2006/0068970 A1 | 3/2006 | Rose | |
| 2012/0178576 A1* | 7/2012 | Beechie | F01N 5/02 475/160 |
| 2012/0266970 A1* | 10/2012 | Ramler | F01M 1/10 137/15.01 |
| 2015/0247564 A1 | 9/2015 | De Lathauwer et al. | |
| 2021/0404546 A1* | 12/2021 | Balistreri | B60B 35/163 |
| 2022/0120324 A1* | 4/2022 | Fisher | B60T 5/00 |

FOREIGN PATENT DOCUMENTS

| | | |
|---|---|---|
| DE | 102011078088 A1 | 1/2013 |
| DE | 102016123614 A1 | 6/2017 |
| DE | 102016004271 A1 | 10/2017 |
| DE | 102017123531 A1 | 4/2018 |
| EP | 1058775 B1 | 11/2004 |
| WO | WO2010049411 A1 | 5/2010 |

OTHER PUBLICATIONS

German Search Report issued in application No. DE102021213838.1 dated Apr. 11, 2022 (10 pages), which is a German counterpart application of U.S. Appl. No. 17/248,668.

* cited by examiner

*Primary Examiner* — Long T Tran

(57) ABSTRACT

Systems and methods for selectively cooling a vehicle fluid are disclosed. Particularly, systems and methods for selectively cooling axle fluid of a vehicle are disclosed. By selectively cooling the axle fluid, energy is conserved by avoiding continuously circulating the axle fluid through a cooling system when a temperature of the axle fluid does not satisfy a selected criteria. The systems and methods also disclose selectively heating a fluid, such as an axle fluid, such as upon startup of the vehicle, and selectively cooling the axle fluid once operation of a power source of the vehicle, such as an engine of the vehicle, has ceased.

4 Claims, 4 Drawing Sheets

SYSTEMS AND METHODS FOR CONTROLLING AXLE OIL TEMPERATURE

FIELD OF THE DISCLOSURE

The present disclosure relates generally to system and method for controlling a temperature of axle oil.

BACKGROUND OF THE DISCLOSURE

Agricultural machines, such as a tractor, include an axle that contains a cavity used to store oil or another fluid used to lubricate and cool rotating components of the axle. As the agricultural vehicle is operated, the axle fluid heats. A temperature of the axle fluid may be controlled in order to control a viscosity of the fluid, thereby protecting axle components and avoiding machine downtime.

SUMMARY OF THE DISCLOSURE

A first aspect of the present disclosure is directed to a method of controlling a temperature of an axle fluid. The method may include sensing a temperature of an axle fluid of a vehicle; selectively operating a fluid cooling system if the sensed fluid temperature satisfied a first selected criteria; detecting the temperature of the axle fluid as the fluid cooling system is being selectively operated; and selectively ceasing operation of the fluid cooling system when the sensed axle fluid temperature no longer satisfies the first selected criteria.

A second aspect of the present disclosure is directed to a system for controlling a temperature of an axle fluid. The system may include an axle of a vehicle, the axle forming a cavity; a volume of axle fluid disposed in the cavity; a fluid cooling system in fluid communication with the cavity; and a controller configured to sense a temperature of the axle fluid and selectively operate the fluid cooling system to cool the axle fluid when the sensed axle fluid temperature satisfies a first selected criteria and selectively cease operation of fluid cooling system when the sensed axle fluid temperature no longer satisfies the first selected criteria.

The various aspects of the present disclosure may include one or more of the following features. The fluid cooling system may include a fluid pump operable to flow the axle fluid; a heat exchanger operable to transfer heat between the axle fluid and a second fluid; and a cooling fan operate to engage the second fluid with the heat exchanger. Selectively operating a fluid cooling system if the sensed fluid temperature satisfied a first selected criteria may include selectively operating the fluid pump to pass the axle fluid through the heat exchanger; and selectively operating the cooling fan to force the second fluid into engagement with the heat exchanger. Sensing a temperature of an axle fluid of a vehicle may include sensing the temperature of the axle fluid when a power source of the vehicle is inoperative. The fluid pump may be operated without operating the cooling fan for a selected period of time when the sensed axle fluid temperature of the axle fluid satisfies a second selected criteria. The second selected criteria may include the sensed temperature of the axle fluid being below a second selected temperature. The first selected criteria may include the sensed fluid temperature being above a selected temperature. A viscosity of the axle fluid may be sensed; a determination may be made as to whether the viscosity of the axle fluid satisfies a second selected criteria; and the axle fluid may be passed through a filter when the sensed axle fluid temperature does not satisfy the first selected criteria and when the sensed axle fluid viscosity satisfied the second selected criteria. The second selected criteria may include the sensed axle fluid viscosity being less than a selected viscosity. Passage of the axle fluid through the filter may be prevented when the sensed temperature of the axle fluid does not satisfy the first selected criteria and when the sensed viscosity of the axle fluid does not satisfy the second selected criteria. Sensing a temperature of an axle fluid of a vehicle may include detecting the temperature of the axle oil when a power source of the vehicle is operating. The power source of the vehicle may include an engine of the vehicle.

The various aspects may include one or more of the following features. The controller may be operable to selectively operate the fluid pump to pass the axle fluid through the heat exchanger and selectively operate the cooling fan to force the second fluid into engagement with the heat exchanger when selectively operating the fluid cooling system when the sensed axle fluid temperature satisfies the first selected criteria. The controller may be operable to operate the fluid pump without operating the cooling fan for a selected period of time when the sensed axle fluid temperature satisfies a second selected criteria. The second selected criteria may include the sensed temperature of the axle fluid being below a second selected temperature. The controller may be operable to detect when a power source of the vehicle is operating and, if the power source of the vehicle is not operating, prevent operation of the cooling fan when the sensed axle fluid temperature satisfies the first selected criteria. The first selected criteria may include the sensed fluid temperature being above a selected temperature. The controller may be operable to detect a viscosity of the axle fluid, determine whether the viscosity of the axle fluid satisfies a second selected criteria, and pass the axle fluid through a filter when the sensed axle fluid temperature does not satisfy the first selected criteria and when the sensed axle fluid viscosity satisfied the second selected criteria. The second selected criteria may include the sensed axle fluid viscosity being less than a selected viscosity.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
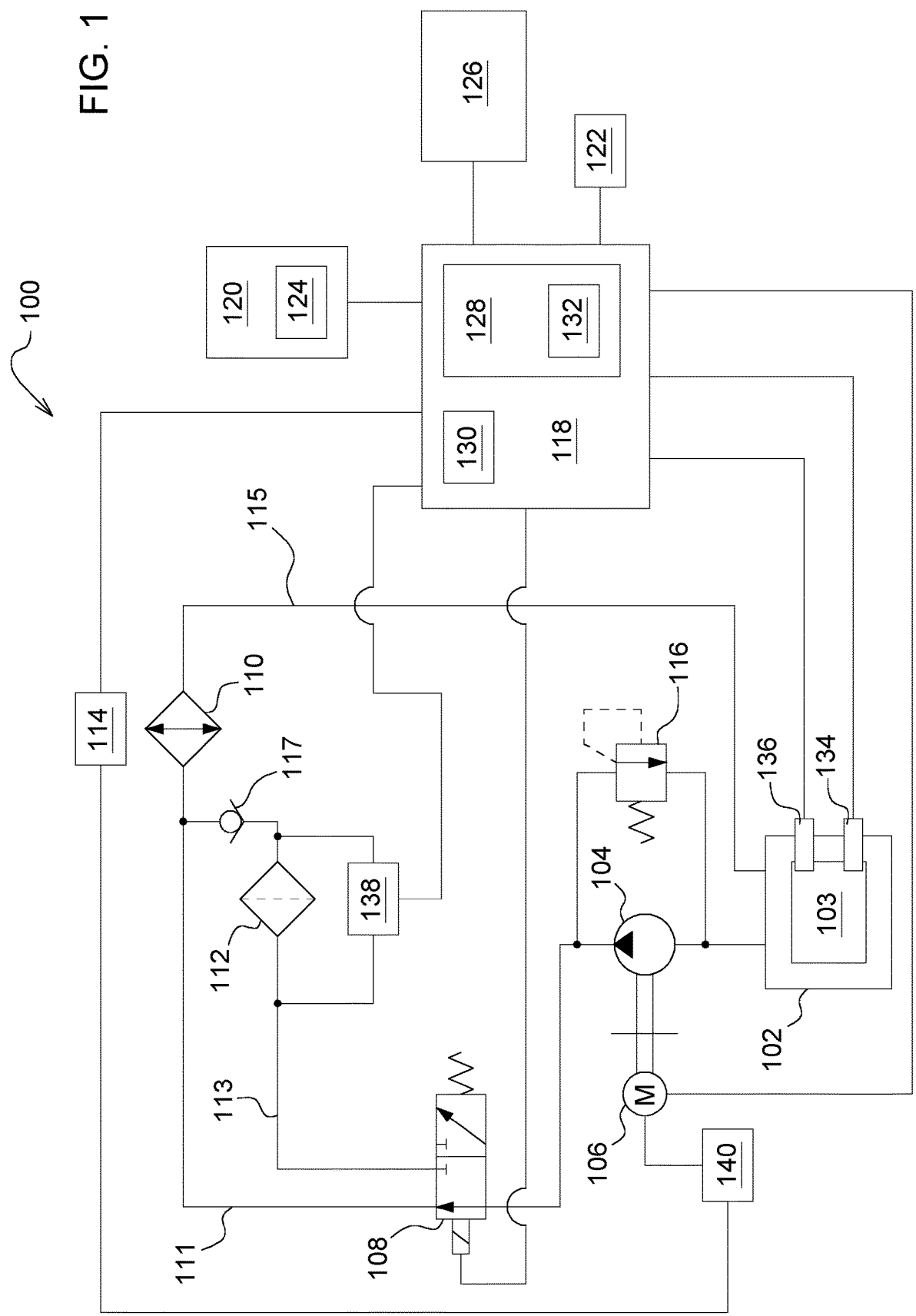
FIG. 1 is a schematic showing an example system that is operable to selectively cool or heat a fluid of a vehicle, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to methods and systems for cooling axle fluid of a vehicle. Particularly, the present disclosure is directed to systems and method for cooling axle oil of agricultural vehicles. However, the scope of the present disclosure includes other types of vehicles that utilize axles that contain a fluid, such as oil, for lubrication of the internal axle components. For example, the scope of the present disclosure encompasses other types of vehicles including construction vehicles, forestry vehicles, and trucks. Other types of vehicles are also included.

During operation, the axle fluid heats. The generated heat can be detrimental to the performance of the axle fluid. For example, the heat can reduce the viscosity of the axle fluid, which, in turn, can reduce the lubrication performance of the fluid. To avoid degradation in performance of the axle fluid, the axle fluid is cooled. Conventionally, the axle fluid is cooled with the use of a cooling system that is continuously operated whether the temperature and viscosity of the axle fluid merit cooling. Continuous operation of such a cooling system uses energy, and the energy used to operate the cooling system is wasted when cooling of the axle fluid is not needed.

The present disclosure provides for selectively cooling axle fluid when properties, such as temperature, viscosity, or both satisfy selected criteria. Thus, selective cooling of the axle oil improves efficiency of the vehicle, thereby conserving resources such as fuel.

FIG. 1 is a schematic view of an example system 100 operable to heat, cool, and clean an axle fluid. The system 100 includes a vehicle axle 102, a pump 104, and a motor 106 coupled to and operable to operate the pump 104. The axle 102 contains a volume of axle fluid in a cavity 103. Axle fluid within the scope of the present disclosure include oil or another type of fluid used to lubricate internal components of a vehicle axle. The motor 106 operates the pump 104 to pump the axle fluid. The pumped axle fluid is conducted to a valve 108. The valve 108 is operable direct the axle fluid to a heat exchanger 110 or a bypass line 113 that includes a filter 112. In the illustrated example, the valve 108 is a two-position solenoid-operated valve. The valve 108 is moveable between a first position and a second position. In the first position, the valve 108 conducts axle fluid to the heat exchanger 110 via a line 111, bypassing the filter 112. In the second position, the valve 108 directs the axle fluid into a bypass line 113 that contains the filter 112 and a check valve 117. Axle fluid moving through the bypass line 113 is passed through the filter 112 and the check valve 117. The check valve 117 permits flow in a first direction and prevents flow in a second, opposite direction. In this case, the check valve 117 is configured to prevent fluid flow from the line 111 and into the bypass line 113. After passing through the filter 112, the axle fluid is passed through the heat exchanger 110. Thus, with the valve 108 in the second position, the axle oil is passed both through the filter 112 and the heat exchanger 110.

The heat exchanger 110 is operable to remove heat from the axle fluid, such as by radiation, convection, conduction, or a combination of these. A cooling fan 114 is located adjacent to the heat exchanger 110. In some implementations, the cooling fan 114 forms part of the heat exchanger 110. The cooling fan 114 operates to pass a fluid (such as a gas (e.g., air) or liquid) over the heat exchanger 110, through the heat exchanger 110, or both. The filter 112 removes particulates or other contaminants from the axle oil. Contamination of the axle oil can alter the viscosity of the axle fluid and, therefore, affect the ability of the axle fluid to lubricate the internal components of the axle 102. The axle fluid is returned to the axle 102 after passing through the heat exchanger 110 or both the filter 112 and the heat exchanger 110 via return line 115.

The system also includes a bypass valve 116. The bypass valve 116 automatically opens when a pressure of the axle fluid being pumped by pump 104 exceeds a selected pressure, causing the axle fluid to be returned to the axle 102.

The system also includes an electronic controller 118 that controls operation of the system 100. In the illustrated example, a display 120 is communicably coupled to the controller 118. The display 120 is operable to display information, such as information associated with the system 100. In some implementations, the display 120 is a touch display, permitting a user to use the display 120 as an input device, as discussed in more detail below. In addition to or alternatively, a separate user interface may be communicably coupled to the controller 118. As shown in FIG. 1, a user interface 122 is also communicably coupled to the controller 118. User interfaces, such as a keyboard, a mouse, or a joystick, included within the scope of the present disclosure are described in more detail below. The display 120 is operable to display a graphical user interface ("GUI") 124. GUIs included within the scope of the present disclosure are described in more detail below.

In some implementations, the controller 118 is in the form of a computer system, such as the computer system 400, described in more detail below. Additional details of the controller 118, such as processor 202 and memory 204, are included below in the context of computer system 400.

The controller 118 includes the processor 128 that is communicatively coupled to the memory 130. The memory 130 communicates with the processor 128 and is used to store programs and other software and information (such as in the form of data). The processor 128 is operable to execute programs and software and receive information from and send information to the memory 130. Although a single memory 130 and a single processor 128 are illustrated, in other implementations, a plurality of memories, processors, or both may be used. Although the processor 128 and the memory 130 are shown as being local components of the controller 118, in other implementations, one or both of the processor 128 and memory 130 may be located remotely. Software 132, such as in the form of an application or program, is executed by the processor 128 to control operation of the system 100, as described in more detail below.

The system 100 and, particularly, the controller 118 is communicably coupled to an engine 126 or other power source of a vehicle. The controller 118 receives information from the engine 126. For example, the controller 118 receives information from the engine 126 regarding the operating state of the engine 126. Particularly, the controller 118 receives information from the engine 126 indicating that the engine is operating or not operating or receives information that the controller 118 uses to determine whether the engine 126 is operating or not operating.

The controller 118 is communicably coupled to the axle 102 and receives axle fluid temperature information and axle fluid viscosity information from a temperature sensor 134 and a viscosity sensor 136, respectively. In some implementations, the temperature and viscosity of the axle fluid is measured continuously by the temperature sensor 134 and the viscosity sensor 136, respectively. The controller 118 is also communicably coupled to the motor 106, the valve 108, the cooling fan 114, and a pressure sensor 138 that senses an axle fluid pressure in the bypass line 113. The pressure sensor 138 detects a differential pressure across the filter 112. The detected differential pressure is used to determine whether the filter 112 is clogged or otherwise unsatisfactory for further filtering of the axle fluid. The controller 118 is operable to control whether the motor 106 is operated and the speed of operation of the motor 106. In some implementations, the controller 118 is operable to control whether the cooling fan 114 is operating and a speed at which the cooling fan 114 operates.

The communication connections between the controller 118 and the other components of system 100 described herein include wired and wireless connections. For example, the wired and wireless connections include those that conform to one or more of the communication protocols described in more detail later or according to other wired or wireless communication protocols.

Figure 2:
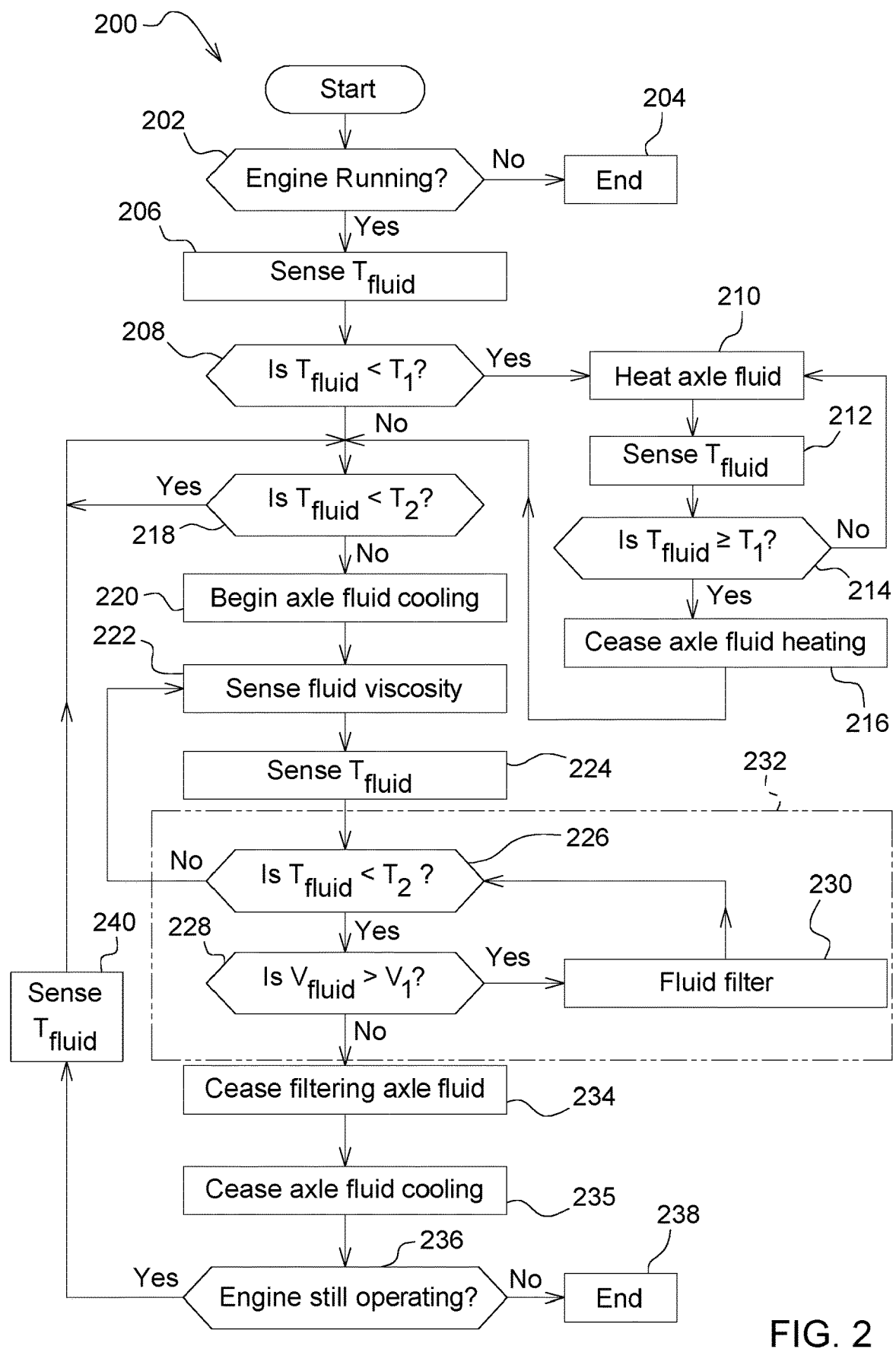
FIG. 2 is a flowchart of an example method for selectively heating and cooling a fluid of a vehicle, according to some implementations of the present disclosure.

FIG. 2 is a flowchart of an example method 200 for controlling cooling, heating, and filtration of axle fluid of a vehicle. In some implementations, the example method 200 is utilized by a controller, such as the controller 118 of FIG. 1, to control an axle fluid cooling system, such as system 100 of FIG. 1. In the course of the description of the method 200, features of the system 100 are referenced as an example. However, the scope of the example method 200 is not limited to the example system 100 but, rather, is applicable to other axle fluid cooling and filtering systems.

At 202, a determination is made as to whether an engine or other power source of a vehicle is presently operating. For example, controller 118 detects whether engine 126 is presently operating based, for example, on information received from the engine 126. If the power source is not presently operating, the method 200 terminates at 204. If the power source is determined to be running, the method moves to 206 where a temperature of the axle fluid is sensed. In some implementations, the temperature of the axle fluid is sensed by a temperature sensor, such as temperature sensor 134. At 208, a determination is made as to whether the sensed temperature, $T_{Fluid}$, satisfies selected criteria.

In the illustrated example, the selected criteria is whether the sensed temperature $T_{Fluid}$ is less than a selected temperature, $T_1$. In some implementations, the selected temperature $T_1$ is a temperature above which the axle fluid is to be heated. The selected temperature $T_1$ may be any desired temperature. The sensed temperature $T_{Fluid}$ of the axle fluid is compared to selected temperature value $T_1$. In this example, if the $T_{Fluid}$ less that the selected temperature $T_1$, the axle fluid is heated, as indicated at 210. In some implementations, heating of the axle fluid involves circulating axle fluid through a cooling system without the use of convective cooling. For example, in some implementations, elimination of convective cooling involves omitting the use of a cooling fan used to force air around or through a heat exchanger. The shear forces generated by circulation of the axle fluid works to heat the axle fluid.

In the context of system 100, pump 104 is actuated to begin pumping of the axle fluid. For example, the sensed temperature $T_{Fluid}$ sensed by the temperature sensor 134 is sent to the controller 118 where the controller 118 compares the sensed temperature $T_{Fluid}$ to $T_1$. If the sensed temperature $T_{Fluid}$ is less than the selected temperature $T_1$, then the controller 118 sends a signal to the motor 106, causing the motor 106 to activate. Because the motor 106 is coupled to the pump 104, the pump 104 is operated in response to activation of the motor 106. However, the controller 118 does not activate the cooling fan 114. Consequently, circulating the axle fluid through the system 100 does not operate to cool the axle fluid convectively because the cooling fan 114 is not activated. As a result, the axle oil is heated by circulating the axle fluid.

At 212, the temperature $T_{Fluid}$ of the axle fluid is again sensed. For example, the axle fluid temperature $T_{Fluid}$ is sensed by the temperature sensor 134, and the sensed temperature information is sent to the controller 118. At 214, a determination is made as to whether the sensed temperature $T_{Fluid}$ satisfies second criteria. In this example, the second criteria includes a determination as to whether the sensed temperature $T_{Fluid}$ is greater than or equal to the selected temperature $T_1$. If the sensed temperature $T_{Fluid}$ is greater than or equal to the selected temperature $T_1$, then heating of the axle oil is ceased, as indicated at 216. If the sensed temperature $T_{Fluid}$ is not greater than or equal to the selected temperature $T_1$, then the method 200 returns to 210, and heating of the axle fluid continues. Thus, heating of the axle fluid continues until the axle fluid temperature $T_{Fluid}$ is greater than or equal to the selected temperature $T_1$.

In the example shown in FIG. 1, the controller 118 receives the new axle temperature from the temperature sensor 134 and compares the received axle fluid temperature to the selected temperature $T_1$. If the axle temperature is greater than or equal to the selected temperature $T_1$, the controller 118 ceases operation of the motor 106, which, in turn, ceases operation of the pump 104. As a result, circulation of the axle fluid ceases, which stops heating of the axle fluid. If the sensed axle temperature $T_{Fluid}$ remains less than the selected temperature $T_1$, operation of the motor 106 and pump 104 continues, and the axle fluid continues to circulate. Consequently, heating of the axle fluid continues.

Returning to 208, if the sensed axle temperature $T_{Fluid}$ is determined to be greater than or equal to the selected temperature $T_1$, then the method moves to 218. Similarly, if heating of the axle fluid was performed, the method moves from 216, where heating was ceased, to 218. At 218, a determination is made as to whether the sensed axle fluid temperature $T_{Fluid}$ satisfies third criteria. In this example, at 218, a determination is made as to whether the sensed temperature $T_{Fluid}$ is less than a selected temperature $T_2$. If the sensed temperature $T_{Fluid}$ is less than selected temperature $T_2$, then the method returns to 218. If the sensed temperature $T_{Fluid}$ is greater than or equal to the selected temperature $T_2$, the method moves to 220 where cooling of the axle fluid is initiated. The selected temperature $T_2$ represents a temperature at which cooling of the axle fluid is to begin.

In the context of the system 100 shown in FIG. 1, the controller 118 receives the temperature of the axle fluid $T_{Fluid}$ sensed by the temperature sensor 134. The controller 118 compares the sensed temperature $T_{Fluid}$ to the selected temperature $T_2$. If the sensed temperature $T_{Fluid}$ is greater than or equal to the selected temperature $T_2$, the controller activates the pump 104 via motor 106 as well as the cooling fan 114. As a result, the axle fluid is circulated, and heat is removed from the axle fluid at the heat exchanger 110 with the assistance of the cooling fan 114.

At 222, a viscosity $V_{Fluid}$ of the axle fluid is sensed, and, at 224, the temperature of the axle fluid, $T_{Fluid}$, is sensed once again. In some implementations, the viscosity $V_{Fluid}$ is sensed by a viscosity sensor, such as viscosity sensor 136 described earlier. At 226, a determination is made as to whether the sensed temperature $T_{Fluid}$ of the axle fluid satisfies criteria, such as whether the sensed temperature $T_{Fluid}$ is less than the selected temperature $T_2$. If the sensed temperature $T_{Fluid}$ is not less than $T_2$, then the method 200 returns to 222, where the viscosity and, subsequently, temperature of the axle fluid are sensed at 222 and 224, respectively. Consequently, cooling of the axle fluid continues.

If the sensed temperature $T_{Fluid}$ of the axle fluid is less than the selected temperature $T_2$ (signaling that the axle fluid has cooled to a desirable level), the method 200 moves to 228 where a determination is made as to whether the sensed viscosity $V_{Fluid}$ satisfies selected criteria. In this example, the sensed viscosity $V_{Fluid}$ is compared to a selected viscosity $V_1$. Generally, viscosity changes with temperature. For example, as a temperature of a fluid decreases, the viscosity of the fluid increases. Further, generally, as a fluid becomes contaminated, the viscosity of the fluid increases. Thus, as a general matter, for a particular axle fluid that is contaminated, when the sensed temperature $T_{Fluid}$ is less than the selected temperature T2, the sensed viscosity $V_{Fluid}$ is greater than the selected viscosity $V_1$. Therefore, at 228, if the sensed viscosity $V_{Fluid}$ is greater than the selected viscosity $V_1$ and the sensed temperature $T_{Fluid}$ is less than the selected temperature $T_2$, an indication that the axle fluid contaminated exists. As a result, at 230, the axle fluid is filtered.

In the context of the example system 100 of FIG. 1, the controller receives the sensed temperature $T_{Fluid}$ and the sensed viscosity $V_{Fluid}$ from the temperature sensor 134 and the viscosity sensor 136, respectively. If the sensed temperature $T_{Fluid}$ is less than the selected temperature $T_2$ but the sensed viscosity $V_{Fluid}$ is greater that $V_1$, then the controller sends a signal to the valve 108, moving the valve 108 from the first position to the second position, which, in turn, directs the axle fluid through the bypass line 113 and through the filter 112. The method 200 returns to 226 after fluid filtration is initiated at 230. Filtration of the axle fluid continues until both the sensed temperature $T_{Fluid}$ of the axle fluid is less than the selected temperature $T_2$ and the sensed viscosity $V_{Fluid}$ of the axle fluid is less than the selected viscosity $V_1$, and the method 200 repeats loop 232 until both of the criteria represented in 226 and 228 are satisfied. Once 226 and 228 are satisfied, the method 200 moves to 234, where filtering of the axle fluid is ceased. At 235, cooling of the axle fluid is ceased.

In the context of the example system 100 of FIG. 1, when the controller 118 determines that the sensed temperature $T_{Fluid}$ is less than the selected temperature $T_2$ and that the sensed viscosity $V_{Fluid}$ is less than the selected viscosity $V_1$, the controller sends a signal to the valve 108 that causes the valve 108 to return to position one, thereby sending the axle fluid into line 111 and preventing further filtration of the axle fluid. The controller also sends signals to the motor 106 and the cooling fan 114 that ceases operation respectively thereof. Consequently, the cooling fan 114 and the pump 104, via the motor 106, are deactivated, and the axle fluid is no longer circulated and cooled.

Returning to FIG. 2, at 236, a determination is made as to whether the power source of the vehicle is still operating. If the power source is determined to be operating, the method 200 returns to 218, and the method 200 proceeds therefrom. The controller 118 determines whether the engine 126 is still operating based on information received, for example, from the engine 126, as shown in FIG. 1. If the power source is determined to no longer be operating, the method 200 ends at 238. If the power source remains in operation, the method 200 moves to 240 where the temperature of the axle fluid is sensed, and the method 200 continues to 218.

Figure 3:
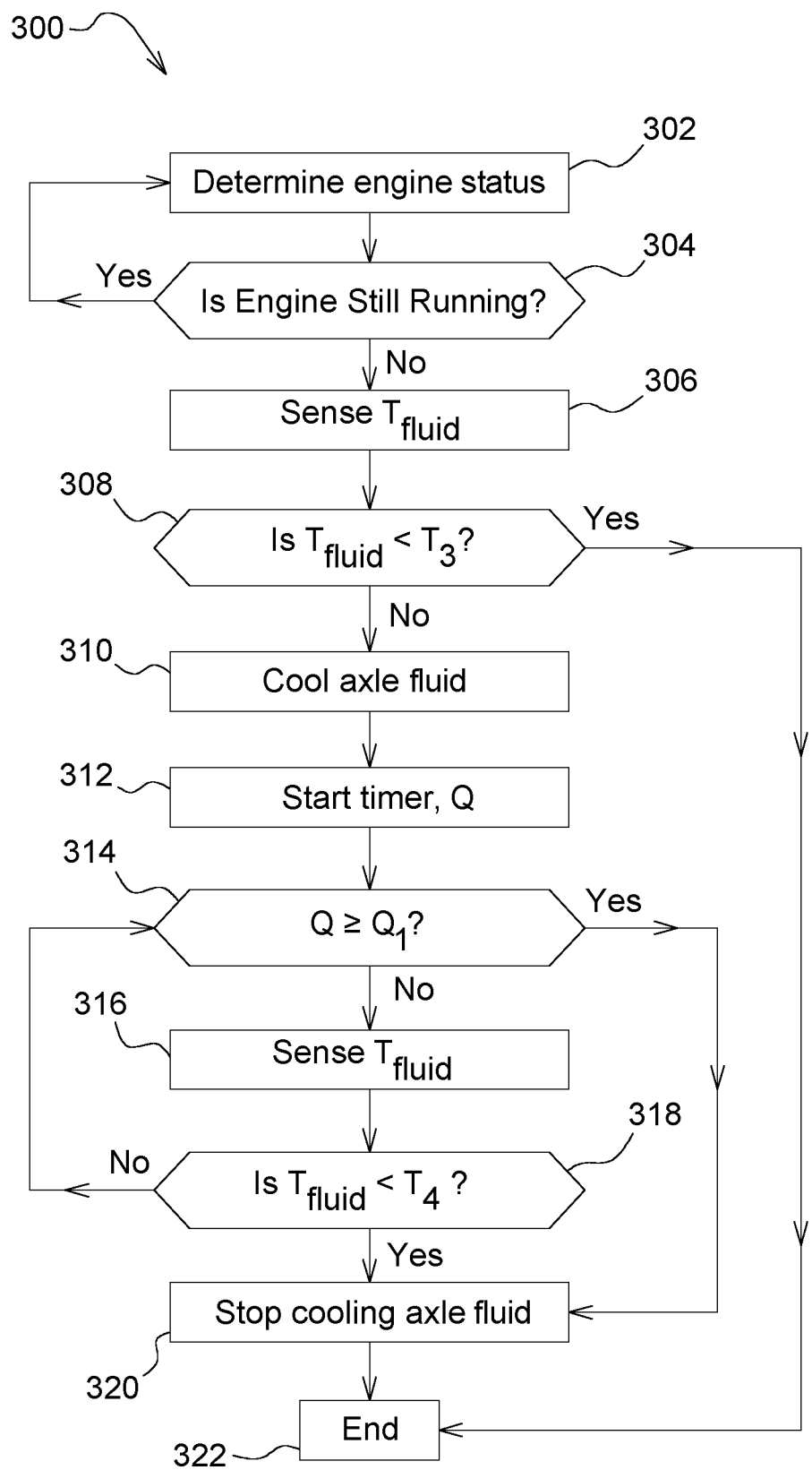
FIG. 3 is a flowchart of an example fluid for selectively cooling a fluid after operation of a power source of a vehicle has ceased, according to some implementations of the present disclosure.

In some implementations, whether the power source is continuing to be operated is sensed at multiple times or is sensed continually. FIG. 3 is a flowchart of an example method 300 for cooling axle fluid upon deactivation of a power source of a vehicle. The method 300 may be performed at multiple times or continuously during the operation of a vehicle. For example, method 300 may be performed at one or more times during the course of method 200 or continuously during the course of method 200.

At 302, a status of a vehicle power source is sensed. At 304, a determination is made as to whether a vehicle power source is still operating. If the power source remains in operation, the method 300 returns to 302. If the operation of the power source has ceased, the temperature of the axle fluid, $T_{Fluid}$, is sensed at 306. At 308, a determination is made as to whether the sensed temperature $T_{Fluid}$ of the axle fluid satisfies criteria. In this example, a determination is made as to whether the sensed temperature $T_{Fluid}$ of the axle fluid is less than a selected temperature $T_3$. In some instances, the selected temperature $T_3$ is a temperature at which the axle fluid has been cooled to a desired level. If the sensed temperature $T_{Fluid}$ is not less than the selected temperature $T_3$, the method 300 moves to 310, where the axle fluid is cooled.

In the example system 100, as shown in FIG. 1, the controller 118 receives the sensed temperature $T_{Fluid}$ from the temperature sensor 134 and compares the sensed temperature $T_{Fluid}$ to the selected temperature $T_3$. If the sensed temperature $T_{Fluid}$ is not less than the selected temperature $T_3$, the controller 118 operates the pump 104 by activating the motor 106 and activates the cooling fan 114. As a result, the axle fluid is circulated and cooled. Because power from the engine 126 is no longer available, i.e., because the engine 126 has ceased operation, electrical power to operate the motor 106 and the cooling fan 114 is provided by a battery 140 or other power source. In some implementations, operation of the cooling fan 114 is omitted and cooling occurs by circulating the axle fluid through the system 100 via the pump 104 that is operated by the motor 106.

Returning again to FIG. 3, at 312, a timer is started to measure time, Q. The time Q is a measurement of the duration of cooling of the axle fluid. At 314, a determination is made as to whether the Q is equal to or greater than a selected time period, $Q_1$. $Q_1$ is a selected amount of time that the axle fluid is to be cooled after the power source has ceased operation. Because cooling of the axle fluid after the power source has ceased operation uses an alternate power source, such as a battery, the selected time period $Q_1$ is selected to avoid reducing the energy level of the battery below a selected level.

If the measured time Q is not greater than or equal to the selected time $Q_1$, cooling continues, and, at 316, the temperature $T_{Fluid}$ of the axle fluid is sensed. At 318, a determination is made as to whether the sensed temperature $T_{Fluid}$ of the axle fluid is less than a selected temperature $T_4$. The selected temperature $T_4$ is a temperature below which the axle fluid is considered to be sufficiently cooled. The temperature $T_4$ can be any desired temperature. In some implementations, the selected temperatures $T_3$ and $T_4$ may be the same temperature. If the sensed temperature $T_{Fluid}$ is not less the selected temperature $T_4$, then the method 300 returns to 314 and continues. As the axle fluid is cooled, for example, when the method 300 returns to 314, the measured time Q is again compared to the selected time $Q_1$. If the measured time Q is greater than or equal to the selected time $Q_1$, then the method moves to 320, and the cooling of the axle fluid is ceased even if the sensed temperature $T_{Fluid}$ is not less than the selected temperature $T_4$. The method 300 continue to 322 where the method 300 ends. In this way, energy in the battery 140 is conserved.

If the sensed temperature $T_{Fluid}$ is less than the selected temperature $T_4$, then cooling of the axle temperature is stopped at 320, and the method 300 ends at 322. Returning to 308, if the sensed temperature $T_{Fluid}$ is less than the selected temperature $T_3$, the method 300 moves to 322 and ends.

In the context of the system 100 of FIG. 1, the controller 118 receives the sensed temperature $T_{Fluid}$ from the temperature sensor 134, and the controller 118 compares the sensed temperature $T_{Fluid}$ to the selected temperature $T_3$. If the $T_{Fluid}$ is less than the selected temperature $T_3$, the axle fluid has been cooled to a desired level. In response, the controller 118 stops operation of the motor 106 (thus, stopping the pump 104) and stops operation of the cooling fan 114, if applicable.

Without in any way limiting the scope, interpretation, or application of the claims appearing below, a technical effect of one or more of the example implementations disclosed herein is to reduce energy consumption by providing selective cooling of a fluid, such as axle fluid of a vehicle. Another technical effect of one or more of the example implementations disclosed herein is to provide selective filtration of a fluid (such as axle fluid) when a fluid viscosity satisfies a selected criteria. Selective filtering prolongs the useful life of a filter. Additionally, selective filtering provides for the use of a filter having a reduced size, which results in a reduced component size and a reduced system size. Further, a filter having a reduced size may also result in the filter having a reduced cost. As a result, filter life is prolonged. Another technical effect of one or more of the example implementations disclosed herein is to provide for initial heating of a fluid, such as axle fluid, when a temperature of the fluid is less than a selected level. By heating the fluid in this manner, an amount of operating time of the vehicle performed to heat the fluid is reduced or eliminated. Another technical effect of one or more of the example implementations disclosed herein is providing for cooling of a fluid, such as axle fluid, when a power source (such as an engine) of a vehicle has ceased operation.

Figure 4:
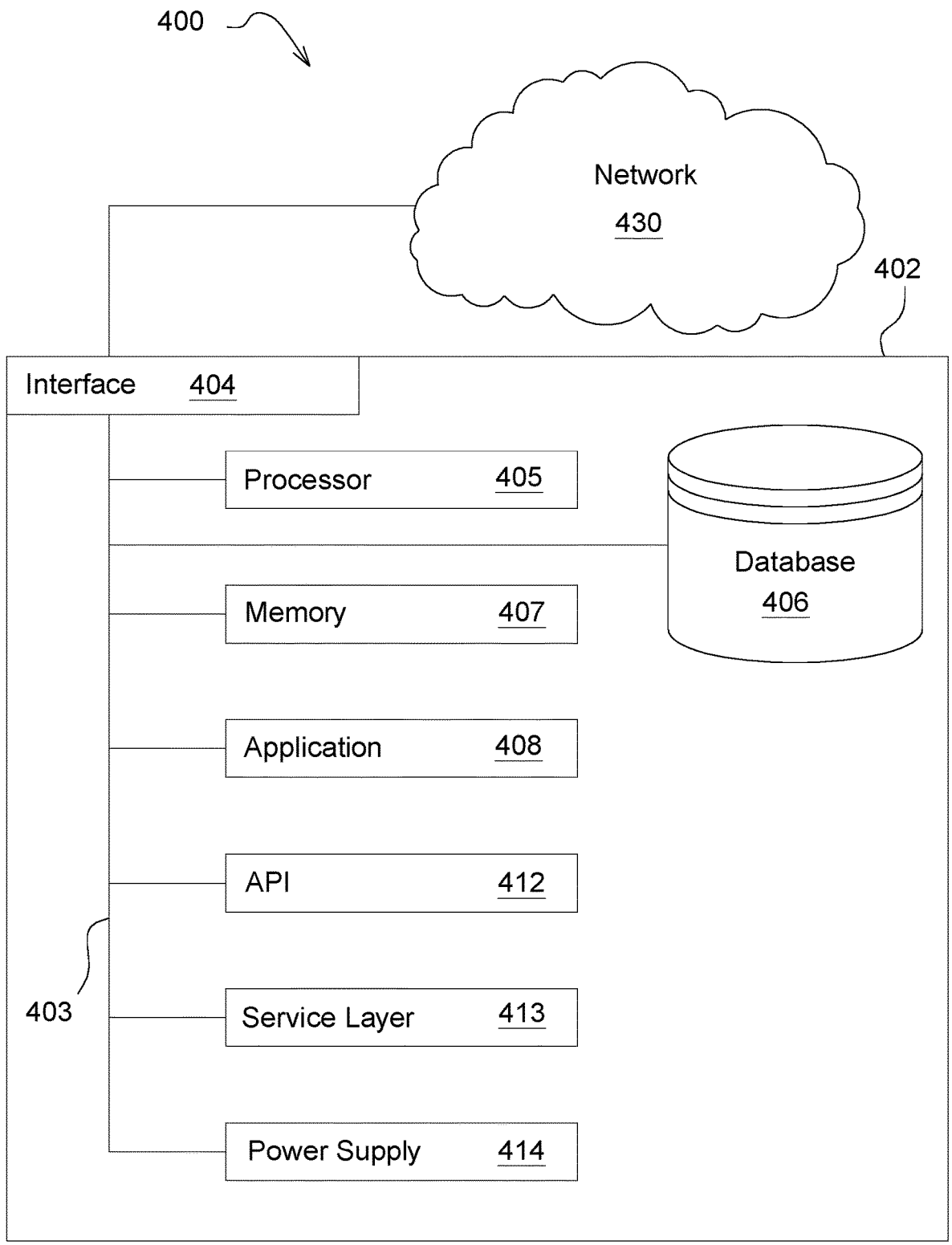
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method that includes: sensing a temperature of an axle fluid of a vehicle; selectively operating a fluid cooling system if the sensed fluid temperature satisfied a first selected criteria; detecting the temperature of the axle fluid as the fluid cooling system is being selectively operated; and selectively ceasing operation of the fluid cooling system when the sensed axle fluid temperature no longer satisfies the first selected criteria.

The foregoing and other described implementations can each, optionally, include one or more of the following features:

A first feature, combinable with any of the following features, wherein the fluid cooling system includes a fluid pump operable to flow the axle fluid; a heat exchanger operable to transfer heat between the axle fluid and a second fluid; and a cooling fan operate to engage the second fluid with the heat exchanger.

A second feature, combinable with any of the previous or following features, wherein selectively operating a fluid cooling system if the sensed fluid temperature satisfied a first selected criteria includes: selectively operating the fluid pump to pass the axle fluid through the heat exchanger; and selectively operating the cooling fan to force the second fluid into engagement with the heat exchanger.

A third feature, combinable with any of the previous or following features, wherein sensing a temperature of an axle fluid of a vehicle includes sensing the temperature of the axle fluid when a power source of the vehicle is inoperative.

A fourth feature, combinable with any of the previous or following features, the method further including operating the fluid pump without operating the cooling fan for a selected period of time when the sensed axle fluid temperature of the axle fluid satisfies a second selected criteria.

A fifth feature, combinable with any of the previous or following features, wherein the second selected criteria includes the sensed temperature of the axle fluid being below a second selected temperature.

A sixth feature, combinable with any of the previous or following features, wherein the first selected criteria includes the sensed fluid temperature being above a selected temperature.

A seventh feature, combinable with any of the previous or following features, the method further including: sensing a viscosity of the axle fluid; determining whether the viscosity of the axle fluid satisfies a second selected criteria; and passing the axle fluid through a filter when the sensed axle fluid temperature does not satisfy the first selected criteria and when the sensed axle fluid viscosity satisfied the second selected criteria.

An eighth feature, combinable with any of the previous or following features, wherein the second selected criteria includes the sensed axle fluid viscosity being less than a selected viscosity.

A nineth feature, combinable with any of the previous or following features, the method further including preventing passage of the axle fluid through the filter when the sensed temperature of the axle fluid does not satisfy the first selected criteria and when the sensed viscosity of the axle fluid does not satisfy the second selected criteria.

A tenth feature, combinable with any of the previous or following features, wherein sensing a temperature of an axle fluid of a vehicle includes detecting the temperature of the axle oil when a power source of the vehicle is operating.

An eleventh feature, combinable with any of the previous features, wherein the power source of the vehicle includes an engine of the vehicle.

In a second implementation, a non-transitory, computer-readable medium storing one or more instructions executable by a computer system to perform operations including: sensing a temperature of an axle fluid of a vehicle; selectively operating a fluid cooling system if the sensed fluid temperature satisfied a first selected criteria; detecting the temperature of the axle fluid as the fluid cooling system is being selectively operated; and selectively ceasing operation of the fluid cooling system when the sensed axle fluid temperature no longer satisfies the first selected criteria.

The foregoing and other described implementations can each, optionally, include one or more of the following features:

A first feature, combinable with any of the following features, wherein the fluid cooling system includes a fluid pump operable to flow the axle fluid; a heat exchanger operable to transfer heat between the axle fluid and a second fluid; and a cooling fan operate to engage the second fluid with the heat exchanger.

A second feature, combinable with any of the previous or following features, wherein selectively operating a fluid cooling system if the sensed fluid temperature satisfied a first selected criteria includes: selectively operating the fluid pump to pass the axle fluid through the heat exchanger; and selectively operating the cooling fan to force the second fluid into engagement with the heat exchanger.

A third feature, combinable with any of the previous or following features, wherein sensing a temperature of an axle fluid of a vehicle includes sensing the temperature of the axle fluid when a power source of the vehicle is inoperative.

A fourth feature, combinable with any of the previous or following features, the non-transitory, computer-readable medium further storing instructions executable by a computer system to perform operations including operating the fluid pump without operating the cooling fan for a selected period of time when the sensed axle fluid temperature of the axle fluid satisfies a second selected criteria.

A fifth feature, combinable with any of the previous or following features, wherein the second selected criteria includes the sensed temperature of the axle fluid being below a second selected temperature.

A sixth feature, combinable with any of the previous or following features, wherein the first selected criteria includes the sensed fluid temperature being above a selected temperature.

A seventh feature, combinable with any of the previous or following features, the non-transitory, computer-readable medium further storing instructions executable by a computer system to perform operations including: sensing a viscosity of the axle fluid; determining whether the viscosity of the axle fluid satisfies a second selected criteria; and passing the axle fluid through a filter when the sensed axle fluid temperature does not satisfy the first selected criteria and when the sensed axle fluid viscosity satisfied the second selected criteria.

An eighth feature, combinable with any of the previous or following features, wherein the second selected criteria includes the sensed axle fluid viscosity being less than a selected viscosity.

A nineth feature, combinable with any of the previous or following features, the non-transitory, computer-readable medium further storing instructions executable by a computer system to perform operations including preventing passage of the axle fluid through the filter when the sensed temperature of the axle fluid does not satisfy the first selected criteria and when the sensed viscosity of the axle fluid does not satisfy the second selected criteria.

A tenth feature, combinable with any of the previous or following features, wherein sensing a temperature of an axle fluid of a vehicle includes detecting the temperature of the axle oil when a power source of the vehicle is operating.

An eleventh feature, combinable with any of the previous features, wherein the power source of the vehicle includes an engine of the vehicle.

In a third implementation, a computer-implemented system, comprising one or more processors and a non-transitory computer-readable storage medium coupled to the one or more processors and storing programming instructions for execution by the one or more processors, the programming instructions including instructions that instruct the one or more processors to: sense a temperature of an axle fluid of a vehicle; selectively operating a fluid cooling system if the sensed fluid temperature satisfied a first selected criteria; detect the temperature of the axle fluid as the fluid cooling system is being selectively operated; and selectively cease operation of the fluid cooling system when the sensed axle fluid temperature no longer satisfies the first selected criteria.

The foregoing and other described implementations can each, optionally, include one or more of the following features:

A first feature, combinable with any of the following features, wherein the fluid cooling system includes a fluid pump operable to flow the axle fluid; a heat exchanger operable to transfer heat between the axle fluid and a second fluid; and a cooling fan operate to engage the second fluid with the heat exchanger.

A second feature, combinable with any of the previous or following features, wherein the programming instructions that instruct the one or more processors to selectively operate a fluid cooling system if the sensed fluid temperature satisfied a first selected criteria includes one or more computer instructions that instruct the one or more processors to: selectively operate the fluid pump to pass the axle fluid through the heat exchanger; and selectively operate the cooling fan to force the second fluid into engagement with the heat exchanger.

A third feature, combinable with any of the previous or following features, wherein the programming instructions that instruct the one or more processors to sense a temperature of an axle fluid of a vehicle includes programming instructions that instruct the one or more processors to sense the temperature of the axle fluid when a power source of the vehicle is inoperative.

A fourth feature, combinable with any of the previous or following features, the computer-implemented system further including programming instructions that instruct the one or more processors to operate the fluid pump without operating the cooling fan for a selected period of time when the sensed axle fluid temperature of the axle fluid satisfies a second selected criteria.

A fifth feature, combinable with any of the previous or following features, wherein the second selected criteria includes the sensed temperature of the axle fluid being below a second selected temperature.

A sixth feature, combinable with any of the previous or following features, wherein the first selected criteria includes the sensed fluid temperature being above a selected temperature.

A seventh feature, combinable with any of the previous or following features, the computer-implemented system further including programming instructions that instruct the one or more processors to: sense a viscosity of the axle fluid; determining whether the viscosity of the axle fluid satisfies a second selected criteria; and pass the axle fluid through a filter when the sensed axle fluid temperature does not satisfy the first selected criteria and when the sensed axle fluid viscosity satisfied the second selected criteria.

An eighth feature, combinable with any of the previous or following features, wherein the second selected criteria includes the sensed axle fluid viscosity being less than a selected viscosity.

A nineth feature, combinable with any of the previous or following features, the computer-implemented system further including programming instructions that instruct the one or more processors to prevent passage of the axle fluid through the filter when the sensed temperature of the axle fluid does not satisfy the first selected criteria and when the sensed viscosity of the axle fluid does not satisfy the second selected criteria.

A tenth feature, combinable with any of the previous or following features, wherein the programming instructions that instruct the one or more processors to sense a temperature of an axle fluid of a vehicle includes the programming instructions that instruct the one or more processors to detect the temperature of the axle oil when a power source of the vehicle is operating.

An eleventh feature, combinable with any of the previous features, wherein the power source of the vehicle includes an engine of the vehicle.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or MS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A method of controlling a temperature of an axle fluid, the method comprising:
    sensing a temperature of an axle fluid of a vehicle;
    selectively operating a fluid cooling system if the sensed fluid temperature satisfied a first selected criteria;
    detecting the temperature of the axle fluid as the fluid cooling system is being selectively operated;
    selectively ceasing operation of the fluid cooling system when the sensed axle fluid temperature no longer satisfies the first selected criteria, sensing a viscosity of the axle fluid;
    determining whether the viscosity of the axle fluid satisfies a second selected criteria; and
    passing the axle fluid through a filter when the sensed axle fluid temperature does not satisfy the first selected criteria and when the sensed axle fluid viscosity does not satisfy the second selected criteria.

2. The method of claim 1, wherein the second selected criteria comprises the sensed axle fluid viscosity being less than a selected viscosity.

3. The method of claim 1, further comprising preventing passage of the axle fluid through the filter when the sensed temperature of the axle fluid does not satisfy the first selected criteria and when the sensed viscosity of the axle fluid does not satisfy the second selected criteria.

4. A system for controlling a temperature of an axle fluid, the system comprising:
    an axle of a vehicle, the axle forming a cavity;
    a volume of axle fluid disposed in the cavity;
    a fluid cooling system in fluid communication with the cavity; and
    a controller configured to sense a temperature of the axle fluid and selectively operate the fluid cooling system to cool the axle fluid when the sensed axle fluid temperature satisfies a first selected criteria and selectively cease operation of fluid cooling system when the sensed axle fluid temperature no longer satisfies the first selected criteria,
    wherein the controller is operable to detect a viscosity of the axle fluid, determine whether the viscosity of the axle fluid satisfies a second selected criteria, and pass the axle fluid through a filter when the sensed axle fluid temperature does not satisfy the first selected criteria and when the sensed axle fluid viscosity does not satisfy the second selected criteria.

* * * * *